(12) United States Patent
Lin et al.

(10) Patent No.: US 10,142,655 B2
(45) Date of Patent: *Nov. 27, 2018

(54) METHOD AND APPARATUS FOR DIRECT SIMPLIFIED DEPTH CODING

(71) Applicant: MediaTek Inc., Hsin-Chu (TW)

(72) Inventors: Jian-Liang Lin, Su'ao Township, Yilan County (TW); Kai Zhang, Beijing (CN); Yi-Wen Chen, Taichung (TW); Jicheng An, Beijing (CN)

(73) Assignee: MEDIATEK INC., Hsin-Chu (TW)

( * ) Notice: Subject to any disclaimer, the term of this patent is extended or adjusted under 35 U.S.C. 154(b) by 146 days.

This patent is subject to a terminal disclaimer.

(21) Appl. No.: 14/762,888

(22) PCT Filed: Apr. 11, 2014

(86) PCT No.: PCT/CN2014/075178
§ 371 (c)(1),
(2) Date: Jul. 23, 2015

(87) PCT Pub. No.: WO2014/166423
PCT Pub. Date: Oct. 16, 2014

(65) Prior Publication Data
US 2015/0365699 A1    Dec. 17, 2015

(30) Foreign Application Priority Data

Apr. 12, 2013 (WO) ............... PCT/CN2013/074161

(51) Int. Cl.
*H04N 19/593* (2014.01)
*H04N 19/176* (2014.01)
(Continued)

(52) U.S. Cl.
CPC ......... *H04N 19/593* (2014.11); *H04N 19/137* (2014.11); *H04N 19/176* (2014.11); *H04N 19/597* (2014.11)

(58) Field of Classification Search
CPC .. H04N 19/593; H04N 19/176; H04N 19/137; H04N 19/597
(Continued)

(56) References Cited

U.S. PATENT DOCUMENTS 9,503,751 B2 * 11/2016 Lin .................... H04N 19/597
2004/0001546 A1 * 1/2004 Tourapis ............... H04N 19/56
375/240.12
(Continued)

FOREIGN PATENT DOCUMENTS

CN   102209243 A   10/2011
CN   102790892     11/2012
(Continued)

OTHER PUBLICATIONS

International Search Report dated Jul. 16, 2014, issued in application No. PCT/CN2014/075178.
(Continued)

*Primary Examiner* — Hee-Yong Kim
(74) *Attorney, Agent, or Firm* — McClure, Qualey & Rodack, LLP

(57) ABSTRACT

A method and apparatus for direct Simplified Depth Coding (dSDC) to derive prediction value directly for each segment without deriving depth prediction samples or depth prediction subsamples. The dSDC method substantially reduces the computations associated with deriving the prediction samples or subsamples and calculating the average of the prediction samples or subsamples by deriving the prediction value directly based on the reconstructed neighboring depth samples. The direct SDC can be applied to derive the two prediction values, P0 and P1 for the two segments of a depth block coded by SDC depth modelling mode 1 (DMM-1).

19 Claims, 3 Drawing Sheets

(51) Int. Cl.
*H04N 19/157* (2014.01)
*H04N 19/597* (2014.01)
*H04N 19/105* (2014.01)
*H04N 19/11* (2014.01)
*H04N 19/184* (2014.01)
*H04N 19/159* (2014.01)
*H04N 7/12* (2006.01)
*H04N 19/137* (2014.01)

(58) Field of Classification Search
USPC .................................................. 375/240.12
See application file for complete search history.

(56) References Cited

U.S. PATENT DOCUMENTS

| | | | |
|---|---|---|---|
| 2012/0183066 A1 | 7/2012 | Oh et al. | |
| 2012/0314767 A1* | 12/2012 | Wang | H04N 19/105 375/240.12 |
| 2014/0044347 A1 | 2/2014 | Sato | |
| 2014/0092957 A1* | 4/2014 | MacInnis | H04N 19/61 375/240.02 |
| 2014/0177720 A1* | 6/2014 | Zhang | H04N 19/52 375/240.16 |
| 2015/0365698 A1* | 12/2015 | Lin | H04N 19/597 375/240.12 |
| 2016/0029038 A1* | 1/2016 | Zhao | H04N 19/119 375/240.12 |

FOREIGN PATENT DOCUMENTS

| | | |
|---|---|---|
| CN | 105308956 A | 2/2016 |
| WO | 2011/046607 A2 | 4/2011 |
| WO | WO 2012/147740 | 11/2012 |

OTHER PUBLICATIONS

Zheng, X., et al.; "References samples sub-sampling for SDC and DMM," Joint Collaborative Team on 3D Video Coding Extension Development of ITU-T SG 16 WP 3 and ISO/IEC JTC 1/SC 29/WG 11; Jan. 2013; pp. 1-4.

* cited by examiner

METHOD AND APPARATUS FOR DIRECT SIMPLIFIED DEPTH CODING

CROSS REFERENCE TO RELATED APPLICATIONS

The present invention is a National Phase Application of PCT Application No. PCT/CN2014/075178, filed on Apr. 11, 2014, which claims priority to PCT Patent Application, Ser. No. PCT/CN2013/074161, filed on Apr. 12, 2013, entitled "Direct Simplified Depth Coding". The PCT Patent Applications are hereby incorporated by reference in their entireties.

FIELD OF INVENTION

The present invention relates to three-dimensional and multi-view video coding. In particular, the present invention relates to depth coding using Simplified Depth Coding.

BACKGROUND OF THE INVENTION

Three-dimensional (3D) television has been a technology trend in recent years that is targeted to bring viewers sensational viewing experience. Multi-view video is a technique to capture and render 3D video. The multi-view video is typically created by capturing a scene using multiple cameras simultaneously, where the multiple cameras are properly located so that each camera captures the scene from one viewpoint. The multi-view video with a large number of video sequences associated with the views represents a massive amount data. Accordingly, the multi-view video will require a large storage space to store and/or a high bandwidth to transmit. Therefore, multi-view video coding techniques have been developed in the field to reduce the required storage space and the transmission bandwidth. In three-dimensional and multi-view coding systems, the texture data as well as depth data are coded.

Simplified depth coding (SDC) and a depth lookup table (DLT) are adopted into HEVC (High Efficiency Video Coding) based Test Model (HTM). For each depth coding unit (CU), if SDC is selected, one of three different prediction modes, i.e., DC, Planar and DMM-1 can be selected. After the prediction, instead of coded as quantized transform coefficients, the SDC-coded residuals are represented by one or two constant residual values depending on whether the depth block is divided into one or two segments. Moreover, the DLT is used to map coded depth values in SDC to valid depth values of the original depth map.

A two-step approach is applied to obtain the prediction values in the SDC prediction stage. First, the normal Intra-prediction procedure using neighboring reconstructed samples is invoked to get all the prediction samples in the coded block. DC, Planar and DMM-1 are three possible prediction modes in this step. Second, the average value of the prediction samples in a segment is calculated as the prediction value for this segment. For DC and Planar modes, there is only one segment in the coded block. For DMM-1 (Depth Modelling Mode 1) mode, there are two segments in the coded block, as the defined by DMM-1 mode. As a simplification, a sub-sampling method by Zheng et al., (CE6.H related: Reference samples sub-sampling for SDC and DMM," Document of Joint Collaborative Team on 3D Video Coding Extension Development, JCT3V-C0154, January 2013), which only uses one from each four prediction samples to get the average value. This method can significantly reduce the summation operations in the averaging process.

FIG. 1 illustrates an example of the two-step SDC prediction approach for the DC mode. The neighboring reconstructed depth values (112) of the current depth block (110) are used as reference samples to form the prediction samples for the current block. The average is derived from the prediction values. The two-step approach introduces a high computational overhead of generating prediction samples and calculating the average value over these samples. Furthermore, a high bit-width is required by the averaging process. In order to reduce the number of prediction samples involved in averaging, the sub-sampling method by Zheng et al., retains one out of four adjacent samples (120). A prediction value P is then derived for the block (130) to be coded or decoded. For decoding, the derived prediction value is added to the residue received to form the reconstructed block (140). In SDC, as many as 64×64/4 prediction samples may be summed together, thus 18 bits are required by the accumulator for 8-bit samples, which is larger than that required by normal intra-prediction.

FIG. 2 illustrates an example of the two-step SDC prediction approach for the DMM-1 mode. The neighboring reconstructed samples (212) of the current depth block (210) are used to form prediction. A subsamples prediction block (220) is used for prediction. The average values (P0 and P1) for each segment is derived to form the prediction block (230). For decoding, respective residues (R0 and R1) are received and added to corresponding prediction values to form the reconstructed block (240) as shown in FIG. 2.

It is desirable to develop process for derivation of the prediction value for each segment that can reduce the required operations or ease the requirement on bit depth to perform summation of a large number of samples.

SUMMARY OF THE INVENTION

A method and apparatus for direct Simplified Depth Coding (dSDC) to derive prediction value directly for each segment without deriving depth prediction samples or depth prediction subsamples are disclosed. Embodiments according to the present invention substantially reduce the computations associated with deriving the prediction samples or subsamples and calculating the average of the prediction samples or subsamples by deriving the prediction value directly based on the reconstructed neighboring depth samples. For example, the direct SDC can be applied to derive the two prediction values, P0 and P1 for the two segments of a depth block coded by SDC depth modelling mode 1 (DMM-1). The derivation of the prediction value can be based on a linear function of the reconstructed neighboring depth samples. For different segments, prediction values can be derived based on different functions of the reconstructed neighboring depth samples. For different SDC modes, prediction values can be derived based on different functions of the reconstructed neighboring depth samples. The prediction value for each segment can be clipped to a range between a minimal depth sample value and a maximal depth sample value. If a reconstructed neighboring depth sample is unavailable, the reconstructed neighboring depth sample can be replaced by another reconstructed neighboring depth sample that is available. Alternatively, the prediction value can be derived based on the remaining available reconstructed neighboring depth samples.

One aspect of the present invention address simplified derivation of the prediction value. The derivation can be based on a small number of reconstructed neighboring depth samples. For example, in the case of SDC DC mode, the small number of reconstructed neighboring depth samples may include a reconstructed neighboring depth sample adjacent to the left of the upper-left corner depth sample of the current depth block and another reconstructed neighboring depth sample adjacent to the top of the upper-left corner depth sample of the current depth block. Depending on the availability of these two samples, the prediction value may be set to the average of these two samples, one of the two samples, or a predetermined value. The predetermined value may correspond to half of the maximal depth value, the average of the maximal and minimal depth values, or 128. For SDC planar mode, the prediction value can be the average of a reconstructed neighboring depth sample diagonally across from the lower-left corner depth sample of the current depth block and another reconstructed neighboring depth sample diagonally across from the upper-right corner depth sample of the current depth block.

DETAILED DESCRIPTION

In the existing Simplified Depth Coding (SDC) which is later termed as Segment-wise DC coding (SDC), the input signal to be coded is the average of the original depth value of the depth block and the output is the predicted depth value of the depth block which is derived from the average of the predicted depth values for the depth block. There is only one predicted depth value for each segment according to the existing SDC. The predicted depth value for each segment is derived from the average of the predicted samples or subsamples of the current block. As mentioned before, the derivation of the average predicted samples is computational intensive, which requires determining predicted samples or subsamples for the current block and summing the predicted samples or subsamples to calculate the average for each segment. Furthermore, the average calculation also increases the bit-width required by the averaging process.

Figure 1:
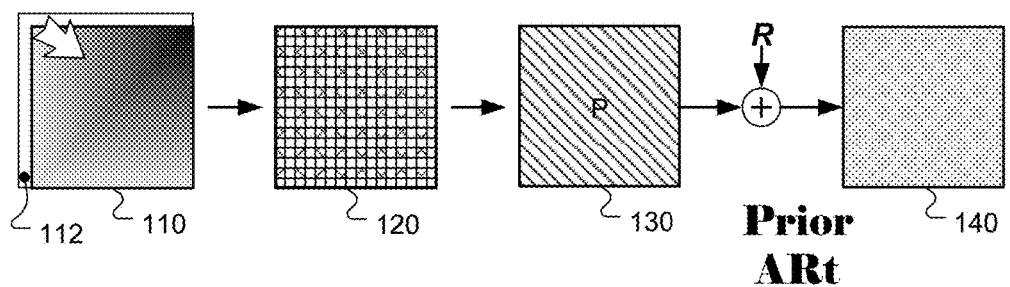
FIG. 1 illustrates the processing steps for depth block decoding based on Simplified Depth Coding (SDC) DC mode, where the depth block contains one segment.
Figure 2:
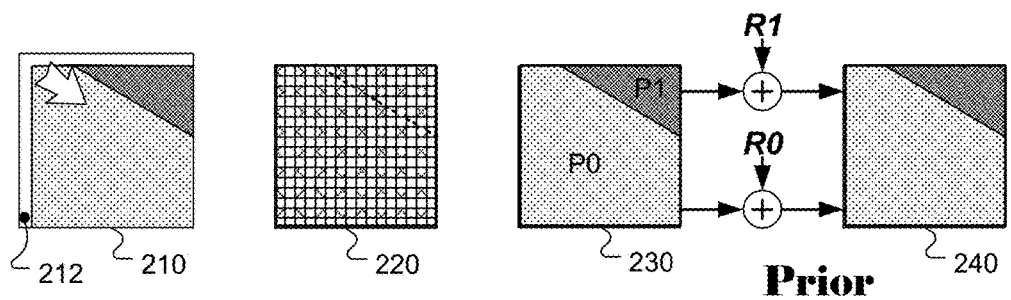
FIG. 2 illustrates the processing steps for depth block decoding based on Simplified Depth Coding (SDC) depth modelling mode 1 (DMM-1), where the depth block is divided into two segments.
Figure 3:
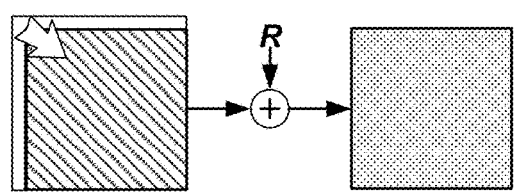
FIG. 3 illustrates the processing steps for depth block decoding incorporating direct Simplified Depth Coding (SDC) according to an embodiment of the present invention for the DC mode.
Figure 4:
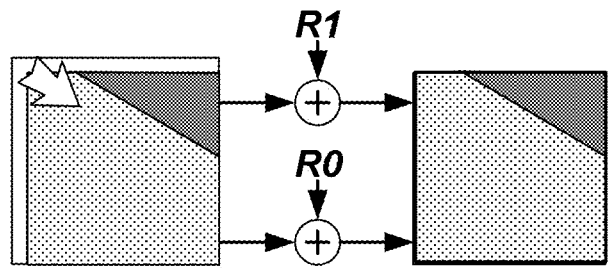
FIG. 4 illustrates the processing steps for depth block decoding incorporating direct Simplified Depth Coding (SDC) according to an embodiment of the present invention for the depth modelling mode 1 (DMM-1).

To simplify the SDC prediction approach further, a direct SDC (dSDC) method is disclosed. In dSDC, the two-step method is removed. Instead, the prediction values are calculated from the neighboring reconstructed samples directly as depicted in FIG. 3 and FIG. 4 for the DC mode and DMM-1 mode respectively. The prediction samples in the coded block are only intermediate variables to derive the one or two final prediction values in the current SDC. Since prediction samples in the coded block are derived from neighboring reconstructed samples, it is more efficient to bypass the Intra-prediction procedure performed in a conventional method and to derive the prediction values in SDC from the neighboring reconstructed samples directly.

To derive the prediction value for each segment, reconstructed neighboring depth samples are received and used to derive the prediction value for each segment. The derivation process for the prediction value can be generalized as $P=f(x_1, x_2, \ldots x_n)$, where P is the prediction value, $x_1, x_2, \ldots, x_n$ are reconstructed neighboring depth samples of the current block, and f(.) is a function. For example, a linear function $$f(x_1, x_2, \ldots x_n) = \sum_{i=1}^{n} a_i x_i$$

can be used, where $a_i$ is weighting coefficient. Different segments may use different functions to derive the prediction values. Furthermore, different functions may be used for different SDC modes. If one of the reconstructed neighboring depth samples is not available, the sample may be replaced by other sample that is available. Alternatively, the prediction value can be derived based on these samples that are available.

Exemplary derivation methods for each mode are as follows.

a) For mode DMM-1.

P0 and P1 are derived following the same method in DMM-1. Without filling each prediction samples and calculating the average values, P0 and P1 are treated as the final prediction values directly.

b) For mode DC.

$$P = \begin{cases} (A+B) \gg 1, & \text{if both } A \text{ and } B \text{ are available,} \\ A, & \text{if only } A \text{ is available,} \\ B, & \text{if only } B \text{ is available,} \\ 128, & \text{if both } A \text{ and } B \text{ are unavailable,} \end{cases}$$

Figure 5:
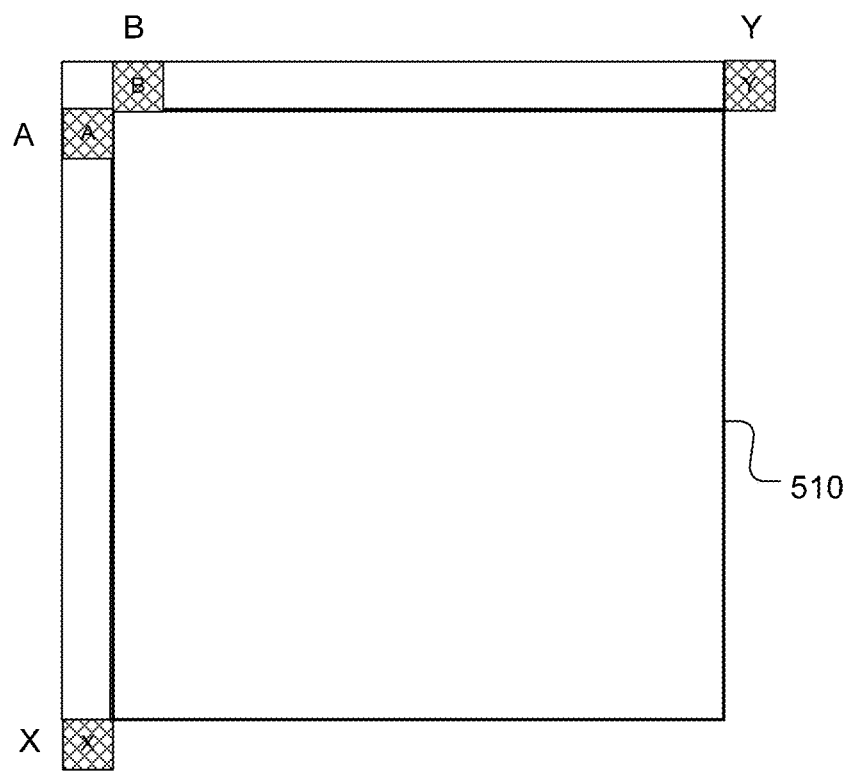
FIG. 5 illustrates an example of the selected samples from the reconstructed neighboring depth samples to derive the prediction values according to an embodiment of the present invention.

In a simplified way, $P=(A+B+1)\gg1$.

c) For mode Planar.

$$P=(X+Y+1)\gg1.$$

where, A, B, X and Y are neighboring reconstructed samples of current block 510 in four different positions as shown in FIG. 5. Sample A corresponds to the position adjacent to the left of the upper-left corner depth sample of the current block. Sample B corresponds to the position adjacent to the top of the upper-left corner depth sample of the current block. Sample X corresponds to the position diagonally across from the lower-left corner depth sample of the current block. Sample Y corresponds to the position diagonally across from the upper-right corner depth sample of the current block.

In the above example, the operation $(A+B)\gg1$ corresponds to the truncated average of A and B. The operation can be replaced by $(A+B+1)\gg1$ to obtain proper rounding. When both A and B are unavailable, other predefined value may be used as well. For example, half of the maximum depth value, i.e., MAX_VALUE/2 may be used. Alternatively, the truncated average of the maximum depth value and the minimal depth value, i.e., (MAX_VALUE+MIN_VALUE)$\gg$1 can be used. Also (MAX_VALUE+MIN_VALUE+1)$\gg$1 can be used to obtain proper rounding.

In some embodiments, prediction values for different SDC modes are derived based on different functions of the reconstructed neighboring depth samples. The prediction values for the two segments for DMM-1 when SDC is used are derived in the same manner as the derivation of the prediction values for DMM-1 when SDC is not used.

The dSDC method simplifies the derivation of prediction values in SDC significantly. First, the high computational overhead of generating prediction samples and calculating the average value over these samples can be removed completely by dSDC. Second, generating a dSDC prediction value is even much simpler than generating a normal prediction sample in mode DC and mode Planar. Third, the high bit-width of the averaging process is avoided in dSDC. In SDC, as many as 64×64/4 prediction samples may be summed together, thus 18 bits are required by the accumulator for 8-bit samples. In dSDC, however, the bit-width does not exceed that needed for conventional intra-prediction.

The performance of a 3D/multi-view video coding system incorporating direct Simplified Depth Coding (dSDC) according to an embodiment of the present invention is compared to that of a conventional system based on HTM-6.0. The types of prediction include DC mode, DMM Mode 1 and Planar mode. The embodiment according to the present invention uses direct SDC, where the prediction value for each segment is derived directly from the neighboring samples without determining all prediction samples or subsamples and calculating the average. The performance comparison is based on different sets of test data listed in the first column. The test results of the system incorporating an embodiment of the present invention under the common test conditions (CTC) and under the all-Intra (AI) test conditions are shown in Table 1 and Table 2, respectively. As shown in the tables, the sample-based SDC can achieve 0.2% BD-rate saving for video over total bit-rate in both common test conditions and all-intra test conditions, and 0.2% and 0.1% BD-rate savings for the synthesized view in common test conditions and all-intra test conditions, respectively.

TABLE 1

| | video 0 | video 1 | video 2 | video PSNR/ video bitrate | video PSNR/ total bitrate | synth PSNR/ total bitrate | enc time | dec time | ren time |
|---|---|---|---|---|---|---|---|---|---|
| Balloons | 0.0% | −0.2% | 0.0% | 0.0% | 0.0% | 0.0% | 100.9% | 98.8% | 100.0% |
| Kendo | 0.0% | 0.1% | 0.0% | 0.0% | 0.1% | 0.1% | 100.8% | 101.8% | 100.2% |
| Newspaper_CC | 0.0% | 0.0% | 0.2% | 0.0% | 0.1% | −0.1% | 100.2% | 101.3% | 101.2% |
| GT_Fly | 0.0% | 0.1% | 0.1% | 0.0% | −0.2% | −0.6% | 100.1% | 100.2% | 97.2% |
| Poznan_Hall2 | 0.0% | −0.7% | −0.2% | −0.2% | −0.2% | −0.3% | 99.2% | 92.90% | 97.1% |
| Poznan_Street | 0.0% | 0.2% | −0.1% | 0.0% | −0.1% | −0.1% | 100.3% | 96.0% | 102.0% |
| Undo_Dancer | 0.0% | −0.1% | −0.1% | 0.0% | 0.0% | −0.2% | 100.3% | 101.9% | 101.2% |
| 1024 × 768 | 0.0% | 0.0% | 0.1% | 0.0% | 0.1% | 0.0% | 100.6% | 100.6% | 100.5% |
| 1920 × 1088 | 0.0% | −0.1% | −0.1% | 0.0% | −0.1% | −0.3% | 100.0% | 97.8% | 99.4% |
| average | 0.0% | −0.1% | 0.0% | 0.0% | 0.0% | −0.2% | 100.3% | 99.0% | 99.9% |

TABLE 2

| | video 0 | video 1 | video 2 | video PSNR/ video bitrate | video PSNR/ total bitrate | synth PSNR/ total bitrate | enc time | dec time | ren time |
|---|---|---|---|---|---|---|---|---|---|
| Balloons | 0.0% | 0.0% | 0.0% | 0.0% | 0.0% | 0.0% | 100.2% | 94.9% | 98.1% |
| Kendo | 0.0% | 0.0% | 0.0% | 0.0% | 0.0% | 0.1% | 100.0% | 102.3% | 101.4% |
| Newspaper_CC | 0.0% | 0.0% | 0.0% | 0.0% | 0.0% | 0.0% | 100.1% | 102.6% | 97.7% |
| GT_Fly | 0.0% | 0.0% | 0.0% | 0.0% | −0.3% | −0.6% | 99.8% | 97.4% | 101.5% |
| Poznan_Hall2 | 0.0% | 0.0% | 0.0% | 0.0% | 0.0% | 0.0% | 99.0% | 105.7% | 101.7% |
| Poznan_Street | 0.0% | 0.0% | 0.0% | 0.0% | −0.1% | −0.1% | 99.9% | 96.9% | 97.6% |

TABLE 2-continued

| | video 0 | video 1 | video 2 | video PSNR/ video bitrate | video PSNR/ total bitrate | synth PSNR/ total bitrate | enc time | dec time | ren time |
|---|---|---|---|---|---|---|---|---|---|
| Undo_Dancer | 0.0% | 0.0% | 0.0% | 0.0% | 0.0% | 0.0% | 99.3% | 96.6% | 99.2% |
| 1024 × 768 | 0.0% | 0.0% | 0.0% | 0.0% | 0.0% | 0.0% | 100.1% | 100.0% | 99.0% |
| 1920 × 1088 | 0.0% | 0.0% | 0.0% | 0.0% | −0.1% | −0.2% | 99.5% | 99.2% | 99.8% |
| average | 0.0% | 0.0% | 0.0% | 0.0% | −0.1% | −0.1% | 99.8% | 99.5% | 99.5% |

Figure 6:
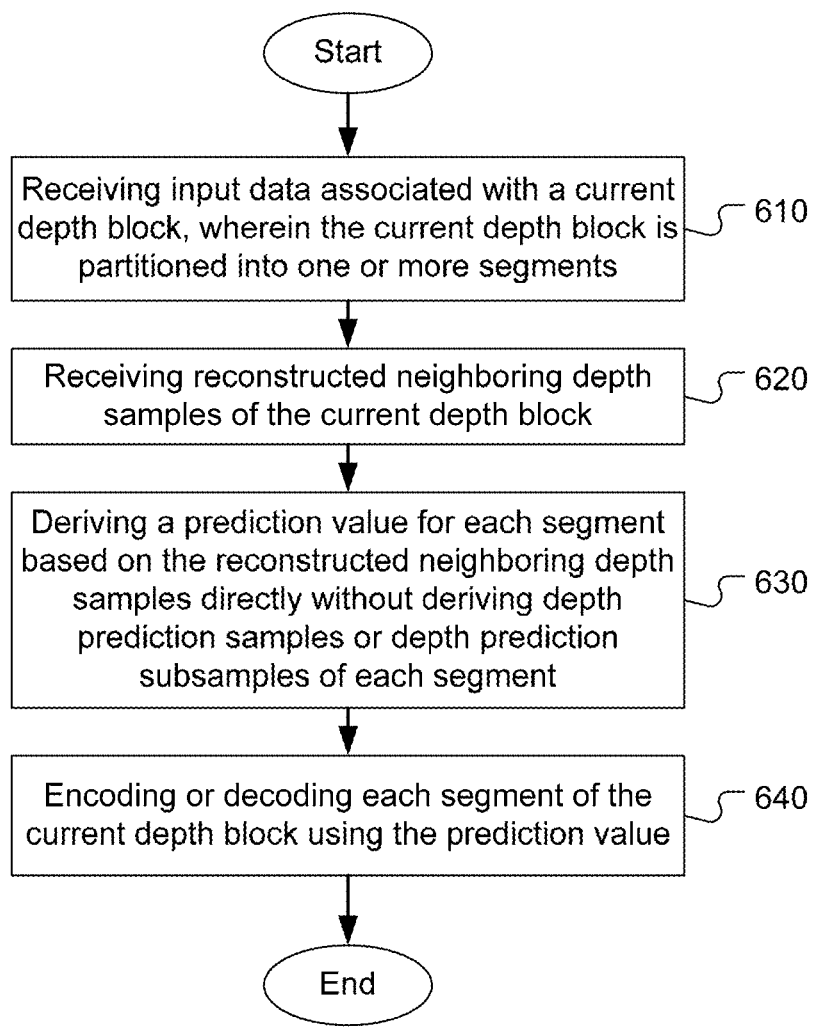
FIG. 6 illustrates an exemplary flowchart for a system incorporating direct Simplified Depth Coding (SDC) according to an embodiment of the present invention.

FIG. 6 illustrates an exemplary flowchart of direct Simplified Depth Coding (dSDC) for depth data using Intra modes according to an embodiment of the present invention. The system receives input data associated with a current depth block as shown in step 610. The current depth block is partitioned into one or more segments. For encoding, the input data associated with the depth block corresponds to the depth samples to be coded. For decoding, the input data associated with the current depth block corresponds to the coded depth data to be decoded. The input data associated with the current depth block may be retrieved from memory (e.g., computer memory, buffer (RAM or DRAM) or other media) or from a processor. The reconstructed neighboring depth samples of the current depth block are received as shown in step 620. A prediction value for each segment is derived based on the reconstructed neighboring depth samples directly without deriving depth prediction samples or depth prediction subsamples of each segment as shown step 630. Encoding or decoding is applied to each segment of the current depth block using the prediction value as shown in step 640.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of Intra coding for a depth block in a three-dimensional coding system, the method comprising:
   receiving input data associated with a current depth block, wherein the current depth block is partitioned into one or more segments;
   receiving reconstructed neighboring depth samples of the current depth block;
   deriving a prediction value for each segment based on the reconstructed neighboring depth samples directly without deriving depth prediction samples or depth prediction subsamples of each segment, wherein the prediction value is derived for each segment based on a function of at least two reconstructed neighboring depth samples adjacent to a depth sample of the current depth block, and wherein the prediction value for each segment is derived based on an average of a first reconstructed neighboring depth sample and a second reconstructed neighboring depth sample; and
   encoding or decoding each segment of the current depth block using the prediction value, wherein the current depth block is coded using simplified depth coding (SDC) Planar mode having one segment and the prediction value, P for said one segment is derived according to $P=(X+Y)>>1$, wherein X corresponds to a first reconstructed neighboring depth sample diagonally across from a lower-left corner depth sample of the current depth block and Y corresponds to a second reconstructed neighboring depth sample diagonally across from an upper-right corner depth sample of the current depth block.

2. The method of claim 1, wherein the current depth block is partitioned into two segments according to Depth Modelling Mode-1 (DMM-1) and two prediction values are derived directly from the reconstructed neighboring depth samples for the two segments.

3. The method of claim 1, wherein the prediction value for each segment is derived based on a linear function of the reconstructed neighboring depth samples.

4. The method of claim 1, wherein the current depth block is partitioned into two segments and two prediction values for the two segments are derived based on two different functions of the reconstructed neighboring depth samples.

5. The method of claim 1, wherein the current depth block is partitioned into one or more segments according to at least two different SDC (simplified depth coding) modes and at least two prediction values for the at least two different SDC modes are derived based on at least two different functions of the reconstructed neighboring depth samples.

6. The method of claim 5, wherein the prediction values for two segments of current depth block coded using Depth Modelling Mode-1 (DMM-1) are derived in a same manner as the derivation of the prediction values for DMM-1 when SDC is not used.

7. The method of claim 1, wherein the prediction value for each segment is clipped to a range between a minimal depth sample value and a maximal depth sample value.

8. The method of claim 1, wherein if one of the reconstructed neighboring depth samples is unavailable, said one of the reconstructed neighboring depth samples is replaced by another reconstructed neighboring depth sample that is available.

9. The method of claim 1, wherein if one or more of the reconstructed neighboring depth samples are unavailable, the prediction value is derived based on rest of the reconstructed neighboring depth samples that are available.

10. The method of claim 1, wherein the first reconstructed neighboring depth sample is located adjacent to left of an upper-left corner depth sample of the current depth block and the second reconstructed neighboring depth sample is located adjacent to top of the upper-left corner depth sample of the current depth block.

11. The method of claim 1, wherein the current depth block is coded using simplified depth coding (SDC) DC mode having one segment and the prediction value, P for said one segment is derived based on:

$$P = \begin{cases} (A+B+1) \gg 1, & \text{if both } A \text{ and } B \text{ are available,} \\ A, & \text{if only } A \text{ is available,} \\ B, & \text{if only } B \text{ is available,} \\ MAX\_VALUE/2, & \text{if both } A \text{ and } B \text{ are unavailable,} \end{cases}$$

wherein A is located adjacent to left of an upper-left corner depth sample of the current depth block, B is located adjacent to top of the upper-left corner depth sample of the current depth block, and MAX_VALUE is a maximal depth value.

12. The method of claim 1, wherein the current depth block is coded using simplified depth coding (SDC) DC mode having one segment and the prediction value, P for said one segment is derived based on:

$$P = \begin{cases} (A+B) \gg 1, & \text{if both } A \text{ and } B \text{ are available,} \\ A, & \text{if only } A \text{ is available,} \\ B, & \text{if only } B \text{ is available,} \\ 128, & \text{if both } A \text{ and } B \text{ are unavailable,} \end{cases}$$

wherein A is located adjacent to left of an upper-left corner depth sample of the current depth block and B is located adjacent to top of the upper-left corner depth sample of the current depth block.

13. The method of claim 1, wherein the current depth block is coded using simplified depth coding (SDC) DC mode having one segment and the prediction value, P for said one segment is derived based on:

$$P = \begin{cases} (A+B+1) \gg 1, & \text{if both } A \text{ and } B \text{ are available,} \\ A, & \text{if only } A \text{ is available,} \\ B, & \text{if only } B \text{ is available,} \\ \left(\dfrac{MAX\_VALUE+}{MIN\_VALUE+1}\right) \gg 1, & \text{if both } A \text{ and } B \text{ are unavailable,} \end{cases}$$

wherein A is located adjacent to left of an upper-left corner depth sample of the current depth block, B is located adjacent to top of the upper-left corner depth sample of the current depth block, MAX_VALUE is a maximal depth value and MIN_VALUE is a minimal depth value.

14. The method of claim 1, wherein the current depth block is coded using simplified depth coding (SDC) DC mode having one segment and the prediction value, P for said one segment is derived based on:

$$P = \begin{cases} (A+B) \gg 1, & \text{if both } A \text{ and } B \text{ are available,} \\ A, & \text{if only } A \text{ is available,} \\ B, & \text{if only } B \text{ is available,} \\ MAX\_VALUE/2, & \text{if both } A \text{ and } B \text{ are unavailable,} \end{cases}$$

wherein A is located adjacent to left of an upper-left corner depth sample of the current depth block, B is located adjacent to top of the upper-left corner depth sample of the current depth block, and MAX_VALUE is a maximal depth value.

15. The method of claim 1, wherein the current depth block is coded using simplified depth coding (SDC) DC mode having one segment and the prediction value, P for said one segment is derived based on:

$$P = \begin{cases} (A+B) \gg 1, & \text{if both } A \text{ and } B \text{ are available,} \\ A, & \text{if only } A \text{ is available,} \\ B, & \text{if only } B \text{ is available,} \\ 128, & \text{if both } A \text{ and } B \text{ are unavailable,} \end{cases}$$

wherein A is located adjacent to left of an upper-left corner depth sample of the current depth block and B is located adjacent to top of the upper-left corner depth sample of the current depth block.

16. The method of claim 1, wherein the current depth block is coded using simplified depth coding (SDC) DC mode having one segment and the prediction value, P for said one segment is derived based on:

$$P = \begin{cases} (A+B) \gg 1, & \text{if both } A \text{ and } B \text{ are available,} \\ A, & \text{if only } A \text{ is available,} \\ B, & \text{if only } B \text{ is available,} \\ \left(\dfrac{MAX\_VALUE+}{MIN\_VALUE}\right) \gg 1, & \text{if both } A \text{ and } B \text{ are unavailable,} \end{cases}$$

wherein A is located adjacent to left of an upper-left corner depth sample of the current depth block, B is located adjacent to top of the upper-left corner depth sample of the current depth block, MAX_VALUE is a maximal depth value and MIN_VALUE is a minimal depth value.

17. An apparatus for Intra coding for a depth block in a three-dimensional coding system, the apparatus comprising one or more electronic circuits configured to:
- receive input data associated with a current depth block, wherein the current depth block is partitioned into one or more segments;
- receive reconstructed neighboring depth samples of the current depth block;
- derive a prediction value for each segment based on the reconstructed neighboring depth samples directly without deriving depth prediction samples or depth prediction subsamples of each segment, wherein the prediction value is derived for each segment based on a function of at least two reconstructed neighboring depth samples adjacent to a depth sample of the current depth block, and wherein the prediction value for each segment is derived based on an average of a first reconstructed neighboring depth sample and a second reconstructed neighboring depth sample; and
- encode or decode each segment of the current depth block using the prediction value, wherein the current depth block is coded using simplified depth coding (SDC) Planar mode having one segment and the prediction value, P for said one segment is derived according to $P=(X+Y)>>1$, wherein X corresponds to a first reconstructed neighboring depth sample diagonally across from a lower-left corner depth sample of the current depth block and Y corresponds to a second reconstructed neighboring depth sample diagonally across from an upper-right corner depth sample of the current depth block.

18. A method of Intra coding for a depth block in a three-dimensional coding system, the method comprising:
- receiving input data associated with a current depth block, wherein the current depth block is partitioned into a plurality of segments;
- receiving reconstructed neighboring depth samples of the current depth block;
- deriving a prediction value for each of said plurality of segments based on the reconstructed neighboring depth samples directly without deriving depth prediction samples or depth prediction subsamples of each segment, and wherein the prediction value for each of said plurality of segments is derived based on an average of a first reconstructed neighboring depth sample and a second reconstructed neighboring depth sample; and
- encoding or decoding each of said plurality of segments of the current depth block using the prediction value, wherein the current depth block is coded using simplified depth coding (SDC) Planar mode having one segment and the prediction value, P for said one segment is derived according to $P=(X+Y)>>1$, wherein X corresponds to a first reconstructed neighboring depth sample diagonally across from a lower-left corner depth sample of the current depth block and Y corresponds to a second reconstructed neighboring depth sample diagonally across from an upper-right corner depth sample of the current depth block.

19. The method of claim 18, wherein the prediction value for one segment is derived only based on a function of the reconstructed neighboring depth samples.

* * * * *